US011994754B2

(12) United States Patent
Stevens et al.

(10) Patent No.: US 11,994,754 B2
(45) Date of Patent: May 28, 2024

(54) GLASSES WITH SELECTIVELY ADJUSTABLE OPTICAL POWER LENSES

(71) Applicant: ADLENS LTD, Eynsham (GB)

(72) Inventors: Robert Edward Stevens, Eynsham (GB); Alex Edginton, Eynsham (GB); Daniel Paul Rhodes, Eynsham (GB); Martyn Francis Kenneally, Eynsham (GB); Simon Peter Horrocks, Eynsham (GB); Benjamin Ian Curnow, Eynsham (GB)

(73) Assignee: ADLENS LTD, Eynsham (GB)

( * ) Notice: Subject to any disclaimer, the term of this patent is extended or adjusted under 35 U.S.C. 154(b) by 21 days.

(21) Appl. No.: 17/372,300

(22) Filed: Jul. 9, 2021

(65) Prior Publication Data

US 2021/0333572 A1    Oct. 28, 2021

Related U.S. Application Data

(63) Continuation of application No. 16/078,137, filed as application No. PCT/GB2017/000024 on Feb. 22, 2017, now Pat. No. 11,194,174.

(30) Foreign Application Priority Data

Feb. 22, 2016    (GB) ...................................... 1603149

(51) Int. Cl.
G02C 7/02      (2006.01)
G02C 7/08      (2006.01)
G02C 13/00     (2006.01)

(52) U.S. Cl.
CPC ............. *G02C 7/024* (2013.01); *G02C 7/081* (2013.01); *G02C 13/001* (2013.01)

(58) Field of Classification Search
CPC ... G02C 7/02; G02C 7/04; G02C 7/06; G02C 7/08; G02C 7/021; G02C 7/024;
(Continued)

(56) References Cited

U.S. PATENT DOCUMENTS 6,742,889 B2    6/2004  Fukuwa
2006/0209430 A1  9/2006  Spivey
(Continued)

FOREIGN PATENT DOCUMENTS

CN    101133354 A    2/2008
CN    102782566 A    11/2012
(Continued)

OTHER PUBLICATIONS

Office Action issued for Japanese Patent Application No. 2021-081586 dated Jul. 5, 2022, 5 pages (with English translation).
(Continued)

*Primary Examiner* — Mustak Choudhury
(74) *Attorney, Agent, or Firm* — Sharon E. Crane

(57) ABSTRACT

A method of fabricating a lens element for an adjustable power lens of the kind comprising two lens elements that are slidable relative to one other in a direction transverse the optical axis of the lens and have respective lens surfaces that are shaped to act together to form a corrective lens, the power of which varies according to the relative disposition of the two lens elements, the method comprising the steps of forming a lens puck having two opposite faces, which are shaped to form opposite lens surfaces of one of the lens elements of the adjustable power lens, the puck having at least one alignment feature, and thereafter edging the puck to a desired eye shape with reference to the alignment feature.

14 Claims, 12 Drawing Sheets

(58) Field of Classification Search
CPC ........ G02C 7/027; G02C 7/028; G02C 7/047; G02C 7/061; G02C 7/063; G02C 7/066; G02C 7/081; G02C 7/085; G02C 9/00; G02C 27/0012; G02C 13/00; G02C 13/001; G02C 13/003; G02C 2202/08; G02C 2202/16; G02C 2202/20; G02B 3/0081; G02B 3/14
See application file for complete search history.

(56) References Cited

U.S. PATENT DOCUMENTS

| | | |
|---|---|---|
| 2006/0209431 A1 | 9/2006 | Spivey |
| 2008/0151184 A1 | 6/2008 | Spivey et al. |
| 2012/0057124 A1* | 3/2012 | Spivey .................... G02C 7/081 351/178 |
| 2012/0113393 A1* | 5/2012 | Spivey .................... G02C 7/061 351/228 |
| 2012/0182459 A1 | 7/2012 | Wada |
| 2013/0141692 A1* | 6/2013 | Crosby .................. G02C 7/081 351/159.48 |
| 2014/0099439 A1 | 4/2014 | Okubo et al. |
| 2014/0211148 A1 | 7/2014 | Crosby et al. |
| 2014/0036863 A1 | 12/2014 | La Naour et al. |
| 2015/0370092 A1 | 12/2015 | Nisper et al. |

FOREIGN PATENT DOCUMENTS

| | | |
|---|---|---|
| EP | 2947505 A1 | 11/2015 |
| EP | 2979814 A1 | 2/2016 |
| EP | 3037852 A1 | 6/2016 |
| GB | 2486212 A | 6/2012 |
| JP | 2000-162557 A | 6/2000 |
| JP | 2003-149607 A | 5/2003 |
| JP | 2012-194547 A | 10/2012 |
| JP | 2014-532900 A | 12/2014 |
| JP | 2016-510437 A | 4/2016 |
| WO | 2006083167 A1 | 8/2006 |
| WO | 2011040136 A1 | 4/2011 |
| WO | 2011086177 A1 | 7/2011 |
| WO | 2012076840 A2 | 6/2012 |
| WO | 2012118089 A1 | 9/2012 |
| WO | 2013030603 A1 | 3/2013 |
| WO | 2013064679 A2 | 5/2013 |
| WO | 2013137179 A1 | 9/2013 |
| WO | 2014124707 A1 | 8/2014 |
| WO | 2015025970 A1 | 2/2015 |

OTHER PUBLICATIONS

Office Action in Chinese patent application No. 202110763122.6 dated Jan. 28, 2023, with English translation, 11 pages.
International Search Report issued in corresponding International Application No. PCT/GB2017/000024, dated Aug. 11, 2017, 5 pages.
Written Opinion of the International Searching Authority issued in corresponding International Application No. PCT/GB2017/000024, dated Aug. 11, 2017, 10 pages.

* cited by examiner

GLASSES WITH SELECTIVELY ADJUSTABLE OPTICAL POWER LENSES

RELATED APPLICATIONS

This application is a continuation of U.S. patent application Ser. No. 16/078,137, filed on Aug. 21, 2018, which is a national stage application, filed under 35 U.S.C. § 371, of International Application No. PCT/GB2017/000024, filed on Feb. 22, 2017, which claims the benefit of, and priority to, U.K. Application No. 1603149.4, filed Feb. 22, 2016. The contents of each of these applications are expressly incorporated herein by reference in their entireties.

The present invention relates to glasses with selectively adjustable optical power lenses and has particular reference to glasses in which at least one of the lenses comprises two superposed lens elements and a selectively operable optical power adjuster, the lens elements being slidable relative to each other in a direction transverse the optical axis of the lens under the control of the optical power adjuster and having respective lens surfaces that are shaped to act together to form a corrective lens, the power of which varies according to the relative disposition of the two lens elements.

Variable power lenses comprising two lens elements arranged in tandem, one behind the other along the optical axis of the lens, are disclosed in U.S. Pat. No. 3,305,294 (Alvarez), the contents of which are incorporated herein by reference. According to U.S. Pat. No. 3,305,294, each of the lens elements has polished surfaces, with one of the surfaces being a regular surface of revolution, and an optical thickness variation parallel to the optical axis less than one-half the lens diameter, the optical thickness t of each lens element parallel to the optical axis z being substantially defined by the formula:

$$t = A\left(\frac{x^3}{3} + xy^2\right) + Dx + E \quad (I)$$

wherein D is a constant representing the coefficient of a prism removed to minimise lens thickness and may be zero, E is a constant representing lens thickness at the optical axis, x and y represent coordinates on a rectangular coordinate system centred on the optical axis and lying in a plane perpendicular thereto, t is the optical thickness parallel to the optical axis and A is a constant representing the rate of lens power variation with lens movement in the x direction. It will be understood that the direction of movement in the x direction is positive for one lens element negative for the other lens element.

Spectacles incorporating such variable power lenses are disclosed in U.S. Pat. No. 5,644,374 (Mukaiyama et al.), United States patent application publication no. US 2008/0030678 A1 (Koops et al.), United States patent application publication no. US 2009/0122254 A1 (Van der Heijde et al.) and international patent application publication no. WO 2013/030603 A1 (Gici Labs LLP).

It is an object of the present invention to provide an improved pair of glasses comprising at least one selectively adjustable optical power lens of this kind.

A different aspect of the invention provides an improved method of making adjustable lenses and lens elements for incorporation into such adjustable lenses.

According to a first aspect of the present invention there is provided pair of glasses comprising two lenses and one or more frame parts; wherein one or both of the lenses is adjustable, comprising two superposed lens elements and a selectively operable optical power adjuster, the lens elements being slidable relative to each another in a direction transverse the optical axis of the lens under the control of the optical power adjuster and having respective lens surfaces that are shaped to act together to form a corrective lens, the power of which varies according to the relative disposition of the two lens elements; wherein the lens elements are configured and arranged such that upon increasing the optical power of the adjustable lens, the centration distance between the two lenses progressively decreases.

Generally, in all of the various aspects of the present invention, the one or more frame parts may themselves be adapted for supporting the glasses on a user's face. In some embodiments, for example, the frame parts may comprise temple arms (or "temples"). However, in other embodiments the frame parts may be mounted to a head-band, a helmet, goggles or any other equipment or part for holding the frame parts, with the lenses, in front of the user's eyes.

The or each adjustable lens defines an optical axis and its two lens elements are superposed one behind the other along the optical axis of the lens. The one or more frame parts typically comprise a nose-bridge, and suitably the lens elements are configured and arranged such that upon increasing the optical power of the adjustable lens, the mid-point of the two lens elements moves towards the nose-bridge. The or each adjustable lens may have an axis of relative movement between the lens elements that extends generally towards and away from the nose-bridge. When worn, the axis of relative movement may be oriented generally horizontally. Adopting the same coordinate system of mutually perpendicular axes x, y and z as described above in relation to formula (I) to define parameters of the lens, the optical axis of the lens may be taken to be the z axis, the axis of relative movement of the lens elements may be designated the x axis, while the y axis may be designated perpendicular to the x axis and perpendicular to the optical axis z. When the glasses are worn, the y axis will usually be oriented generally vertically.

In a pair of glasses, the centration distance between the two lenses should substantially match the interpupillary distance of the user's eyes. When viewing a near object, the user's eyes converge, such that the interpupillary distance ("near PD") is shorter than the interpupillary distance when viewing a distant object ("distant PD"). In accordance with the first aspect of the present invention, the two superposed lens elements of the one or more adjustable optical power lenses are advantageously configured and arranged such as the optical power of the lens is increased for viewing near objects (e.g., for reading) the centration distance of the glasses is progressively reduced.

Since the lens elements of the at least one adjustable lens are movable relative to one another, at least one of the lens elements will usually have a periphery that is at least partially visible within the field of vision of the user when the glasses are worn. The visible portions of the periphery of the at least one lens element may be visible as an edge. In some embodiments, both lens elements may have a periphery that is at least partially visible as an edge to the wearer. Alternatively, one of the lens elements may have periphery that is visible at least in part, while the other lens element may have a periphery that is concealed by one or more of the frame parts such, for example, as a rim or surround, which serves to hide at least part of the edge of the other lens element.

If the lens elements are movable relative to one another along the x-axis, as described above, at least portions of the periphery of the at least one lens element that extend along the y-axis may be visible to the user. In particular, an inner side edge disposed proximate the nose-bridge and an outer side edge disposed away from the nose-bridge may be visible as edges, as described above. By configuring and arranging the lens elements of the at least one adjustable lens such that as the optical power of the lens is increased by moving the lens elements relative to one another along the x-axis such that the centration distance between the two lenses of the power of glasses is decreased, the inner side edge of the at least one lens element may move progressively towards the nose-bridge. In this way, as the wearer increases the power of the at least one adjustable lens for viewing near objects, and the user's eyes converge, the visible edge at the inner side of the at least one lens element is moved towards the nose-bridge to offer minimal distraction to the wearer.

In some embodiments, the two superposed lens elements may be arranged such that when they are arranged in the position of maximal optical power, the inner or outer side edges of the two lens elements may be substantially aligned with one another, one behind the other. In some embodiments, in the maximal power position, the inner side edges of the lens elements are substantially aligned with one another.

The lens elements may have different widths between their respective inner and outer side edges. One of the lens elements may be narrower than the other in the direction of relative movement of the lens elements, i.e. along the x-axis. Suitably the difference in the widths of the two lens elements along the x-axis should be no more than about 8 mm, preferably less than about 6 mm and more preferably no more than about 4 mm.

Each of the lens elements may have an inner side edge and an outer side edge. When the at least one adjustable lens is arranged in its position of maximal power, the inner side edges of the two lens elements may be substantially aligned while their outer side edges may be spaced from one another along the x-axis, for example by a distance equal to the difference in the widths of the two lens elements, as mentioned above.

When the lens is arranged in its position of minimal power the inner or outer side edges of the two lens elements may be substantially aligned with one another in the direction of the optical axis. In some embodiments, in the minimal power position, the outer side edges of the lens elements may be substantially aligned with one another, while their inner side edges may be separated by a distance equal to the difference in the widths of the two lens elements along the x-axis.

The surfaces of the lens elements should be shaped to provide the required change of optical power between the minimal and maximal power positions.

In some embodiments, both lens elements of the at least one adjustable lens may be movable relative to the one or more frame parts, provided that they are configured and arranged as described above, but conveniently the lens elements may be mounted to the one or more frame parts such that one of the lens elements is movable and the other lens element is immovable relative to the one or more frame parts. Typically, the glasses will have a front and a back relative to the user when the glasses are worn. For aesthetic and practical reasons, the immovable lens element may be mounted in front of the movable lens element. By mounting the movable lens element behind the immovable lens element, the movable lens element may be better protected when the glasses are used. When viewed from the front, the immovable element part may present a more attractive, "normal looking" appearance for the lens than would be the case if the movable lens element were positioned at the front.

The movable lens element may comprise a transparent lens element that is mounted slidably to a frame body for sliding movement in a direction transverse the optical axis of the lens, i.e. the x-axis. The immovable lens element may comprise a transparent lens element that is mounted to the frame body or another frame part such, for example, as a surround.

In some embodiments, the immovable element part may comprise a transparent lens element that is mounted to a detachable frame part, such as a surround, that can be removably fastened to the frame body. As described below, this may facilitate cleaning of the at least one adjustable optical power lens.

Typically, both lenses of the power of glasses in accordance with the first aspect of the present invention may be adjustable. The lenses may be independently adjustable, but in some embodiments the lenses may be linked so they are adjusted together.

In some embodiments, the lens elements may be mounted to the one or more frame parts such that the one lens element is slidably mounted to a frame body forming part of the one or more frame parts and the other lens element is mounted to a detachable frame part that is removably fastened to the frame body, the frame body and the detachable frame part being provided with mutually cooperating formations for accurately positioning the other lens element relative to the one lens element.

In accordance with a second aspect of the present invention therefore there is provided a pair of glasses comprising two lenses and one or more frame parts, including a frame body and one or more detachable frame parts, at least one of the lenses comprising two superposed lens elements and a selectively operable optical power adjuster, the lens elements being slidable relative to each another in a direction transverse the optical axis of the lens under the control of the optical power adjuster and having respective lens surfaces that are shaped to act together to form a corrective lens, the power of which varies according to the relative disposition of the two lens elements; wherein the lens elements are mounted to the one or more frame parts such that one of the lens elements is slidably mounted to the frame body and the other lens element is mounted to a detachable frame part that is removably fastened to the frame body, the frame body and the detachable frame part being provided with mutually cooperating formations for locating the other lens element relative to the one lens element.

Preferably, the other lens element is mounted to the detachable frame part such that it is immovable relative to the detachable frame part.

Suitably the detachable frame part may comprise a peripheral surround that carries the other lens element.

By arranging for the detachable frame part to be removably fastened to the frame body, it can be removed from the frame body when desired for cleaning the lens elements. The at least one adjustable lens defines an optical axis, and its two lens elements may be superposed one behind the other along the optical axis of the lens. Each lens element may be transparent, having two opposite faces, one of which is disposed interiorly of the lens, and the other of which is disposed exteriorly of the lens. The respective interior lens faces of the two lens elements are disposed opposite one another along the optical axis. By detaching the detachable frame part from the frame body, the interior lens faces of the two lens elements may be accessed for cleaning. Suitably, the other lens element may be completely detached from the frame body.

In order to provide a variable power lens, one face of each lens element is formed with a cubic or higher order lens surface, and the other face may be formed with a surface that is a regular surface of revolution. In some embodiments, a cubic or higher order lens surface may be formed on the interior lens face of each lens element, while the regular surface of revolution may be formed on the exterior lens face. The regular surface of revolution may comprise a sphero-cylindrical surface. Alternatively, the other face of one or both lens elements may be formed with a multifocal or progressive lens surface. For various optical and ergonomic reasons, it may be desirable for the lens to define a base curve.

Advantageously, the interior faces of the lens elements may be coated with a hydrophobic, super-hydrophobic or oleophobic coating to aid keeping the interior faces clean and free from dust etc. By way of example, PTFE or a similar base material of the kind well-known in the ophthalmic industry may be used for this purpose.

Any suitable mutually cooperating formations for accurately positioning the detachable frame part on the frame body when attached may be used, but conveniently the mutually cooperating formations may comprise a plurality of alignment pins and corresponding recesses. In some embodiments, the mutually cooperating formations may also be used for attaching the detachable frame part to the frame body, for example by way of friction or snap fitting, but in other embodiments the mutually cooperating formations may be used solely for locating the detachable part on the frame body, and other means may be provided for releasably fastening the detachable part to the frame body. For instance, the detachable frame part and the frame body may be shaped to fit together to form a friction fit or snap-fitting. In some embodiments, one or more magnets may be used to attach the detachable part releasably to the frame body. For instance, one or more magnets may be incorporated into the frame body, and the detachable frame part may be made at least in part from a ferromagnetic metal, or vice versa. In some embodiments, one or more magnets may be embedded in both the frame body and the detachable part.

In some embodiments, the other lens element may comprise a transparent lens element that is mounted to the detachable frame part, such as a surround as mentioned above. The detachable frame part may be formed with a plurality of alignment pins and/or recesses that are configured and arranged to cooperate with a corresponding plurality of recesses and/or alignment pins on the frame body for accurately locating the other lens element relative to the one lens element. It will be understood that it is not necessary for all of the alignment pins to be placed on one or other of the frame body or detachable frame part and all of the recesses to be formed in the detachable frame part or frame body, but it may be convenient to do that in some embodiments.

The pair of glasses will usually inherently define a front and back relative to the user when worn. For the reasons described in relation to the first aspect of the present invention, the other immovable lens element may advantageously be positioned in front of the one slidable lens element.

In accordance with a third aspect of the present invention there is provided an adjustable power lens assembly comprising one or more frame parts, including a frame body, two superposed lens elements and an optical power adjuster, the lens elements being slidable relative to one another in a direction transverse the optical axis of the lens under the control of the optical power adjuster and comprising respective lens surfaces that are shaped to act together to form a corrective lens, the power of which varies according to the relative disposition of the two lens elements; wherein at least one of the lens elements is mounted slidably to the frame body and has a periphery with a plurality of guide formations that cooperate with corresponding formations on the frame body for guiding movement of the at least one lens element relative to the other lens element; wherein the at least one lens element is spring-loaded against the frame body in a direction orthogonal to the axis of sliding.

The adjustable power lens assembly defines optical axis and its two lens elements are superposed one behind the other along the optical axis of the lens. Adopting the same coordinate system of mutually perpendicular axes x, y and z as described above to define parameters of the lens, the optical axis of the lens may be taken to be the z axis, the axis of relative movement of the lens elements may be designated the x axis, while the y axis may be designated perpendicular to the x axis and perpendicular to the optical axis z. The at least one lens element may be sprung-loaded against the frame body in a direction orthogonal to the axis of sliding and the optical axis for registration of the one lens element to a datum. Suitably, therefore, the at least one lens elements may be spring-loaded on the y-axis for registering the lens element to the datum, thereby accurately positioning the lens element relative to the frame body in a direction perpendicular to the direction of relative movement between the two lens elements. In this way, the position of the at least one lens element on the y-axis relative to the frame body may be accurately controlled. Its position along the x-axis is controlled by the optical power adjuster. Advantageously, the rotational tolerance of the at least one lens element relative to the frame body may be minimised. However, in some embodiments, the at least one lens element may additionally or alternatively be sprung-loaded against the frame body in the z-direction.

The at least one lens element may be spring-loaded by at least one spring positioned between a respective one of the guide formations and the frame body in a corresponding recess formed in the frame body.

In some embodiments, at least one of the guide formations may comprise a tab that protrudes from the at least one lens element. The at least one lens element may therefore be spring-loaded by means of at least one spring positioned between the tab and the frame body in the corresponding recess. Said spring may comprise a compression spring, cantilever or leaf spring, for example.

In some embodiments, at least two of the tabs may be provided that protrude outwards from the periphery of the at least one lens element in the same general direction as each other and are received in one or more corresponding channels in the frame body, the tabs and one or more channels being configured and arranged to define a locus of movement of the lens element relative to the frame body. The locus of movement may extend along the x-axis. In some embodiments, the at least two tabs may protrude in the direction of the y-axis. The locus of movement may be curvilinear, which is especially suitable for optical lenses having a base curve as described above, for example in a pair of glasses.

At least one other tab may protrude from the periphery of the at one lens element and be received in a corresponding channel formed in the frame body, said other tab being spring-loaded against the frame body in the direction of the at least two tabs for urging the lens element into positive alignment with the frame body.

Typically, the lens may have a generally quadrilateral shape, having two opposite longer sides and two opposite shorter sides, wherein the at least one lens element is arranged to slide relative to the frame body in a direction generally parallel to the longer sides, the at least two tabs being positioned on one of the longer sides, and the other tab being positioned on the other longer side.

The channels may be shaped as channels or pockets in the frame body. Alternatively the channels may be formed as a series of formations on the frame body that serve to guide the guide formations or tabs for guiding movement of the at least one lens element.

In some embodiments, one of the lens elements may be mounted slidably to the frame body for movement relative to the other lens element, while the other lens element may be mounted to the one or more frame parts such that it is immovable relative to the frame parts.

In a fourth aspect of the present invention there is provided a pair of glasses comprising at least one adjustable power lens assembly according to the third aspect of the invention.

In a fifth aspect of the present invention there is provided a method of fabricating a lens element for an adjustable power lens of the kind comprising two lens elements that are slidable relative to one other in a direction transverse the optical axis of the lens and have respective lens surfaces that are shaped to act together to form a corrective ophthalmic lens, the power of which varies according to the relative disposition of the two lens elements, the method comprising the steps of forming a circular lens puck having two opposite faces, which are shaped in mutually corresponding central regions of each to form opposite lens surfaces of one of the lens elements of the adjustable power lens, the puck having at least one alignment feature, and thereafter edging the puck to a desired eyeshape with reference to the alignment feature.

During the edging step, the lens puck is milled to the desired eyeshape for a given frame; the puck is formed with a peripheral edge of the desired eyeshape. For edging, a conventional lens edging maching may be used.

In some embodiments, the puck may have two or more separate alignment features. Upon edging the puck, at least one alignment feature may remain within the eyeshape. In some embodiments, at least one alignment feature may be disposed outside the desired eyeshape such that it is removed upon edging the puck.

By 'alignment feature' herein is meant a fiducial or other marking that is applied to the puck or incorporated into the puck when it is made. In some embodiments, the alignment feature(s) may be visible or semi-visible markings of the kind known in the art. A semi-visual marking may be particularly suitable for an alignment marking that remains on the lens element after edging the puck.

Suitably the central region of one face of the puck may be formed with a cubic or higher order lens surface such, for example, as a surface defined by formula (I) above, and an aligned central region of the other face may be formed with a lens surface that is a regular surface of revolution. The regular surface of revolution may comprise a sphero-cylindrical surface. Alternatively, the other face of one or both lens elements may be formed with a multifocal or progressive lens surface. Away from the central region of the puck, the one face may comprise one or more peripheral regions where the cubic or higher order lens surface is modulated to control the overall thickness of the puck, for example so it is suitable for moulding.

Suitably the puck may be made by injection moulding from a suitable transparent thermoplastic material.

In some embodiments, the desired eyeshape may be non-circular. Thus, the puck may be edged to form a lens element of circular or non-circular shape.

The puck may be edged to form the desired eyeshape having a periphery and a plurality of tabs that protrude outwardly from the periphery. Alternatively, the tabs may be attached to the lens element after edging.

Lens elements may be made in accordance with the fifth aspect of the present invention in matched pairs for subsequent assembly one behind the other to form a variable optical power lens.

According to a sixth aspect of the present invention therefore there is provided a method of making an adjustable optical power lens of the kind comprising two lens elements that are slidable relative to one another in a direction transverse the optical axis and have respective lens surfaces that are shaped to act together to form a corrective lens, the power of which varies according to the relative disposition of the two lens elements, the method comprising forming two lens elements of the same eyeshape in accordance with the method of the fifth aspect of the present invention, and thereafter assembling the two lens elements in superposed relation such that they are slidable relative to one another in a direction transverse the optical axis and providing an optical power adjuster for controlling the relative disposition of the two lens elements.

In some embodiments, the lens made in accordance with the invention may provide a maximum power change of at least about +0.75 dioptres, preferably at least +2.0 dioptres, and more preferably at least +3.5 dioptres.

Advantageously, each lens element may have at least one alignment feature within the eye shape as described above, the method comprising aligning the lens elements with one another using the alignment features within the eye shape In a seventh aspect of the present invention there is provided a method of making a pair of glasses which comprises making at least one adjustable optical power lens in accordance with the sixth aspect of the invention and assembling the at least one adjustable lens with a second lens and one or more frame parts, including a nose-bridge and temple arms, for mounting the glasses on a wearer's face. In some embodiments, the second lens may also be adjustable.

The present invention also comprehends a lens made in accordance with the method of the sixth aspect of the invention and a pair of glasses made in accordance with the method of the seventh aspect of the invention.

Following is a description by way of example only with reference to the accompanying drawings of embodiments of the present invention.

Figure 1:
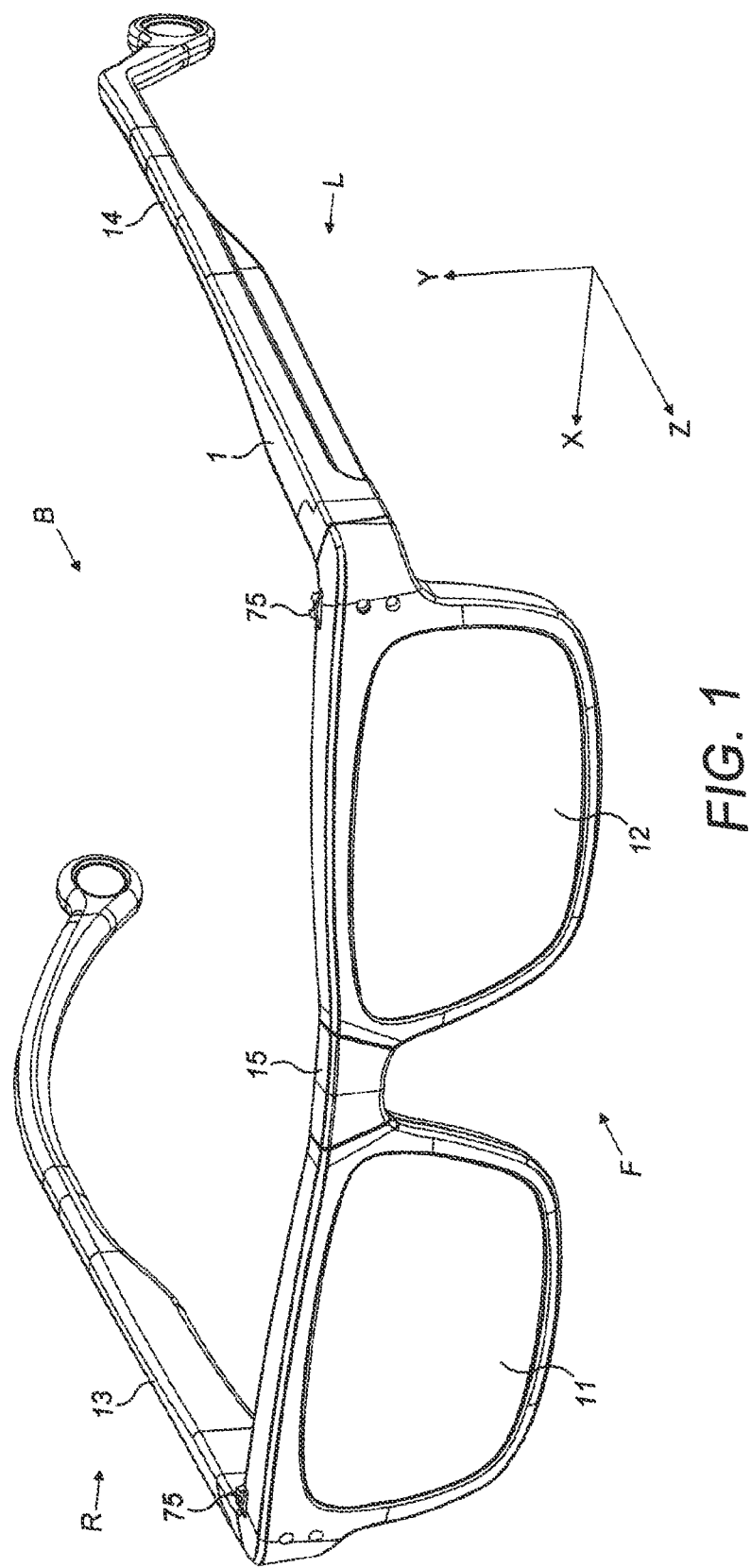
FIG. 1 is a perspective view from the front, above and to one side of a pair of glasses in accordance with the present invention comprising two variable power lenses and showing a rectangular coordinate system of mutually perpendicular axes x, y and z for defining parameters of each lens, with the z-axis designated parallel to the optical axis of the lens.
Figure 10:
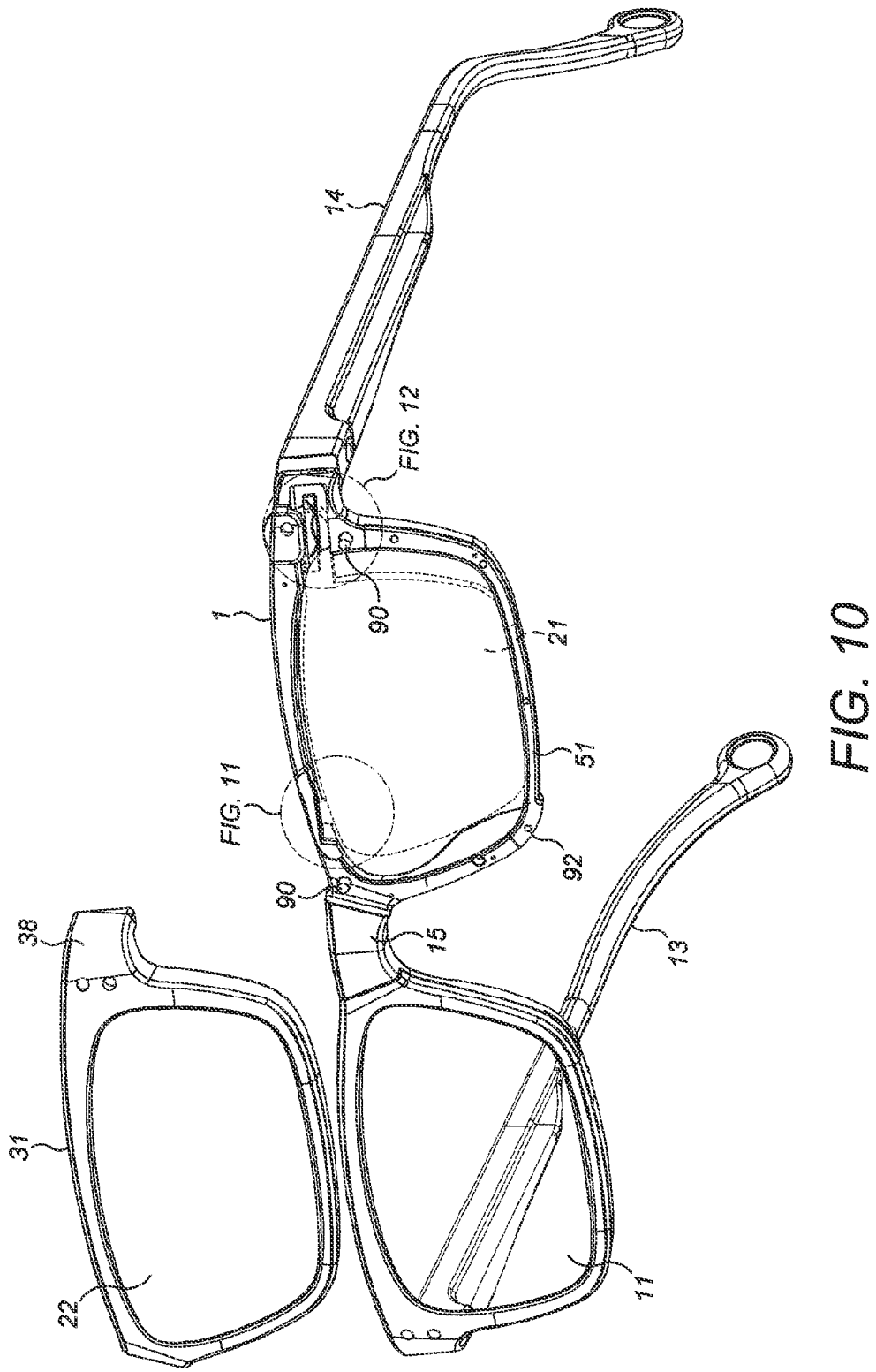

FIG. 10 is another front view from below and to one side of the glasses of FIG. 1 showing the detachable frame part, which carries the front lens element of the left-hand variable power lens, removed and the rear lens element fitted in the frame body to show the engagement of the tabs of the rear lens element in the corresponding channels in the frame body for guiding movement of the rear lens element.

Figure 11:
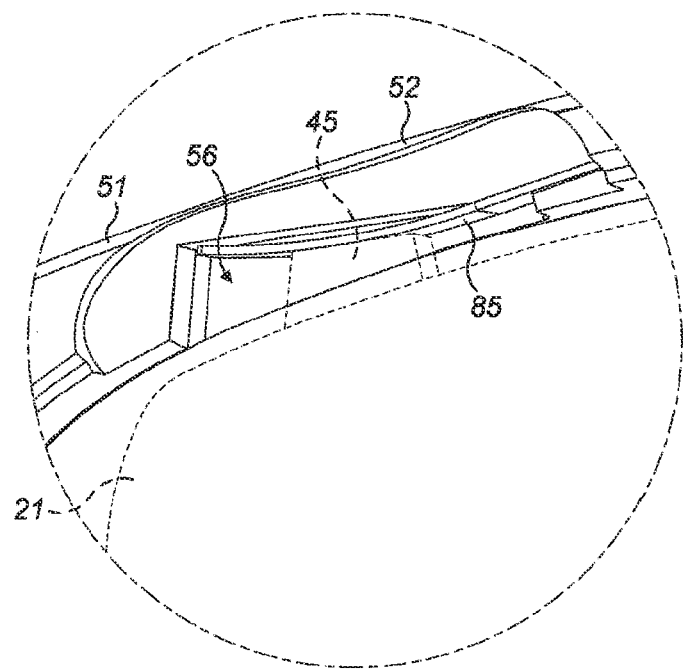

FIG. 11 is an enlarged view of a portion of FIG. 10, showing the upper inner tab on the rear lens element disposed in its corresponding channel.

Figure 12:
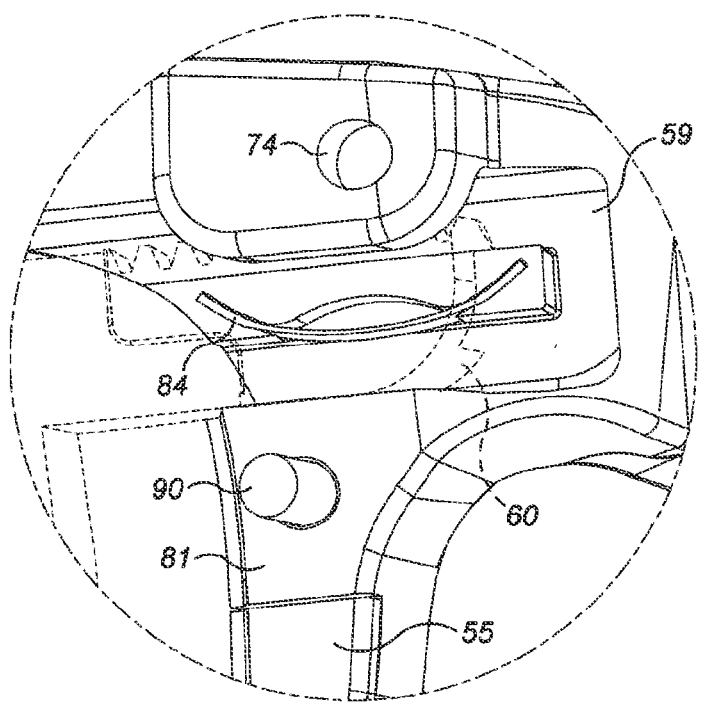

FIG. 12 is another enlarged view of a different portion of FIG. 10, showing the upper outer tab on the rear lens element disposed in its corresponding channel in the frame body.

Figure 13:
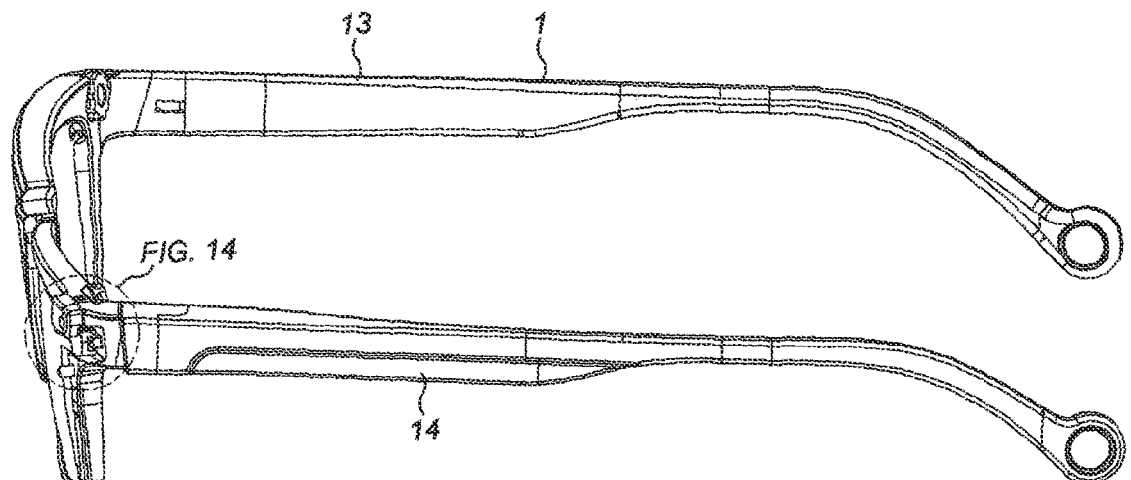

FIG. 13 is a side view of the glasses of FIG. 1 from above, with the front lens element of the left-hand lens detached.

Figure 14:
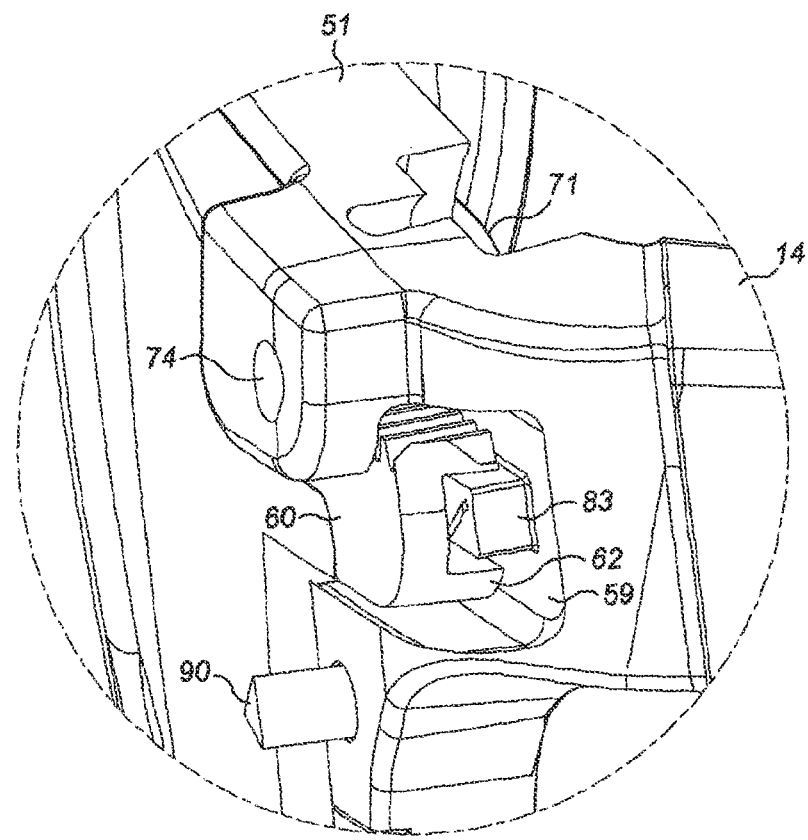

FIG. 14 is an enlarged view of a portion of FIG. 13 showing the upper outer tab on the rear lens element of the left-hand lens disposed slidably in its corresponding channel.

Figure 15:
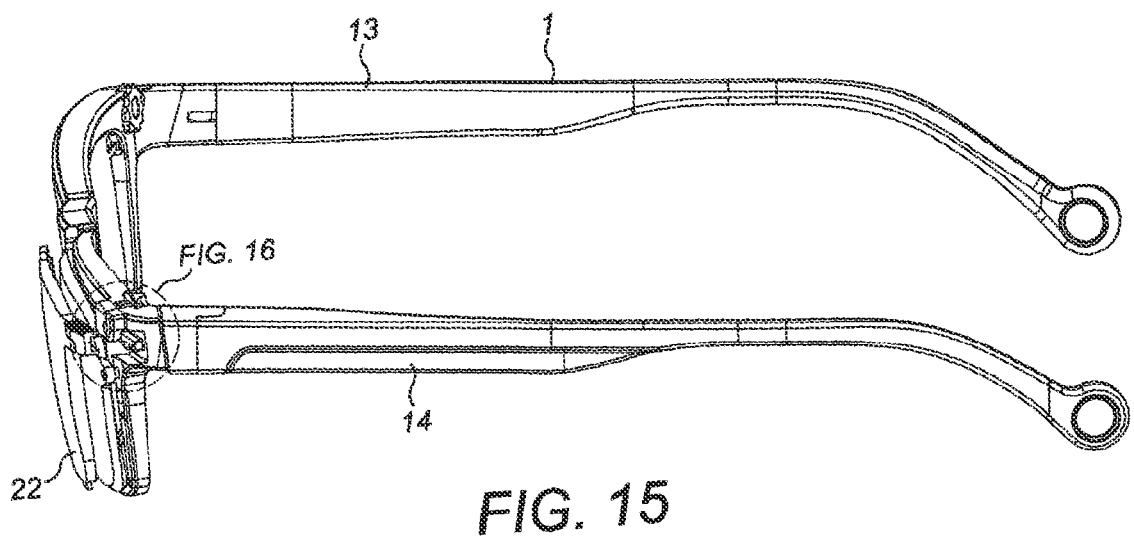

FIG. 15 is another side view of the glasses of FIG. 1 from above with the front lens element of the left-hand lens detached, corresponding to FIG. 13, but with the rear lens element exploded from the frame body.

Figure 16:
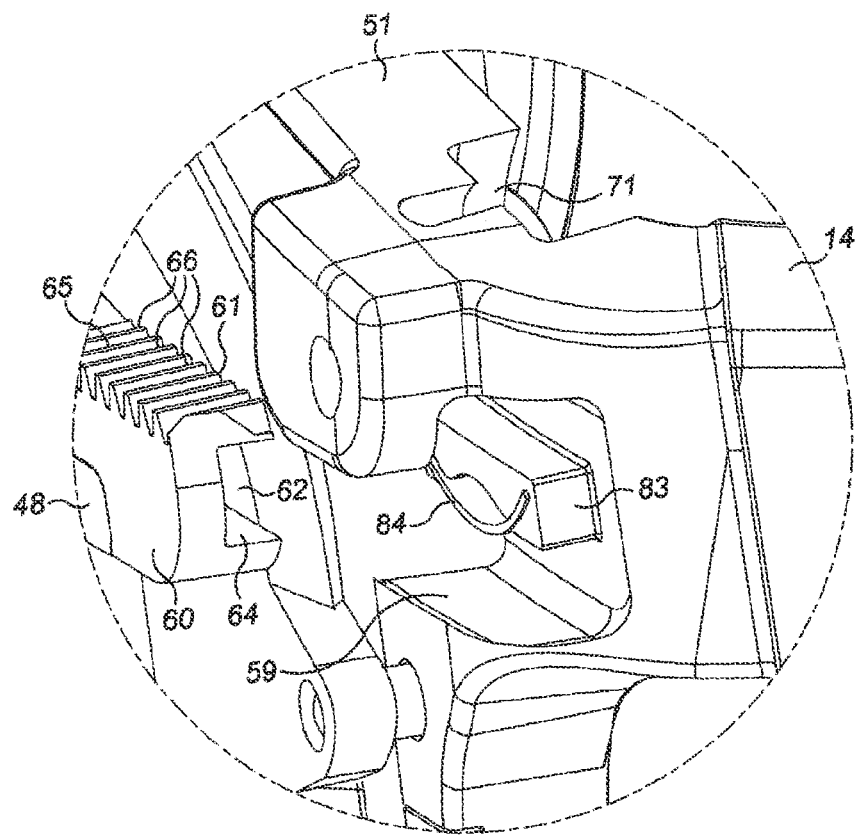

FIG. 16 is an enlarged view of a portion of FIG. 15 showing how the upper outer tab on the rear lens element of the left-hand lens and the corresponding channel are configured.

Figure 17:
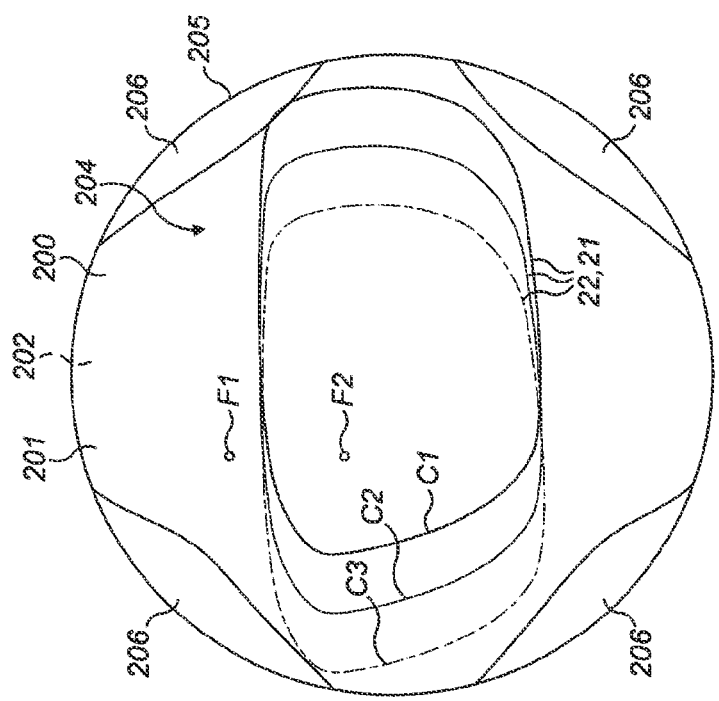

FIG. 17 shows a circular puck for making a lens element in accordance with the invention, showing the outlines of a plurality of different lens elements of varying centrations that can be cut out from the puck.

Figure 18:
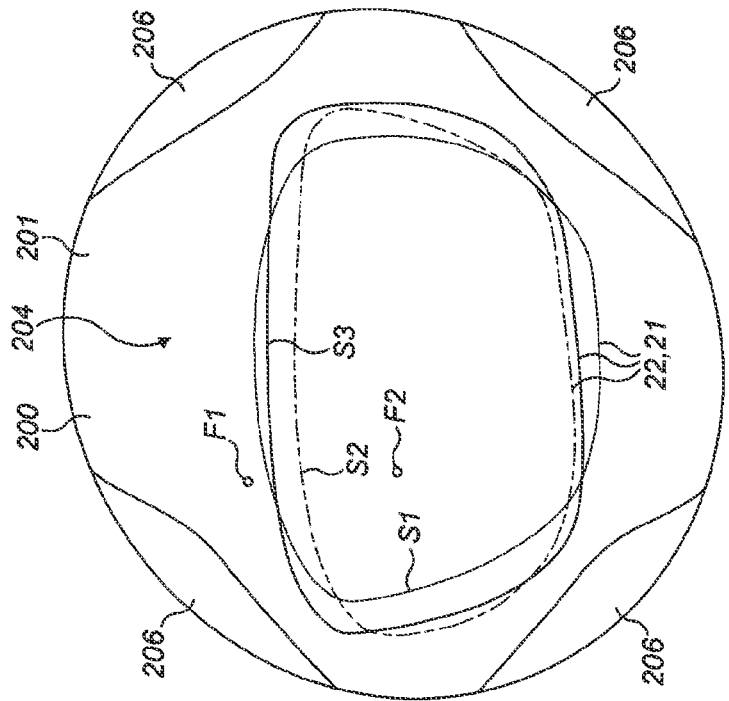

FIG. 18 shows a circular puck for making a lens element in accordance with the invention, showing the outlines of a plurality of different lens elements of varying eyeshapes that can be cut out from the puck.

FIG. 1 shows a pair of glasses 1 in accordance with the present invention. The glasses 1 comprise two lenses 11, 12 and a plurality of frame parts for holding the lenses 11, 12 and for supporting the glasses on the face of a wearer (not shown) such that the lenses 11, 12 are disposed in front of the wearer's eyes. The frame parts of the pair of glasses 1 illustrated in FIG. 1 are conventional insofar as they comprise two temple arms 13, 14 and a nose-bridge 15, which may be fitted with nose-pads (not shown). The shapes of the lenses 11, 12, temple arms 13, 14 and nose-bridge 15 are not critical to the present invention and may be varied as desired. For instance, in some embodiments, the lenses 11, 12 may be integrated into a helmet or goggles, or the frame parts may be connected to a head-band or the like for retaining the lenses 11, 12 in front of the wearer's eyes. In the present embodiment, non-round lenses 11, 12 are employed.

Since they are designed to be worn by a person, the glasses 1 have an intrinsic orientation, having left and right sides, indicated by the letters L and R respectively in FIG. 1, a front and back, indicated by the letters F and B, a top and bottom and, for each of the left and right sides of the glasses, inner and outer regions relative to the nose-bridge 15. It will be appreciated that the right and left temple arms 13, 14 and right and left lenses 11, 12 have reflectional symmetry with one another.

Each of the lenses 11, 12 is a variable optical power lens, as described in more detail below. Whilst in the present embodiment, both lenses are variable power lenses, in some other embodiments of the invention only one of the lenses may have variable power, while the other may have a fixed optical power or even no optical power, depending on the intended application or use for the glasses. For instance, a pair of glasses comprising a single variable power lens may be useful in post-eye surgery situations where the optical power of one of a patient's eyes may fluctuate during a period of recuperation. In the embodiment shown, the lenses 11, 12 are independently adjustable, but it is envisaged that in some embodiments the lenses 11, 12 may be linked so they are adjusted together.

Each lens 11, 12 has an optical axis. A rectangular coordinate system of mutually perpendicular axes x, y and z is a convenient way for describing parameters of the lens. The z-axis is designated parallel to the optical axis, as shown in FIG. 1. The orientations of the x-axis and y-axis are explained in more detail below.

Figure 4:
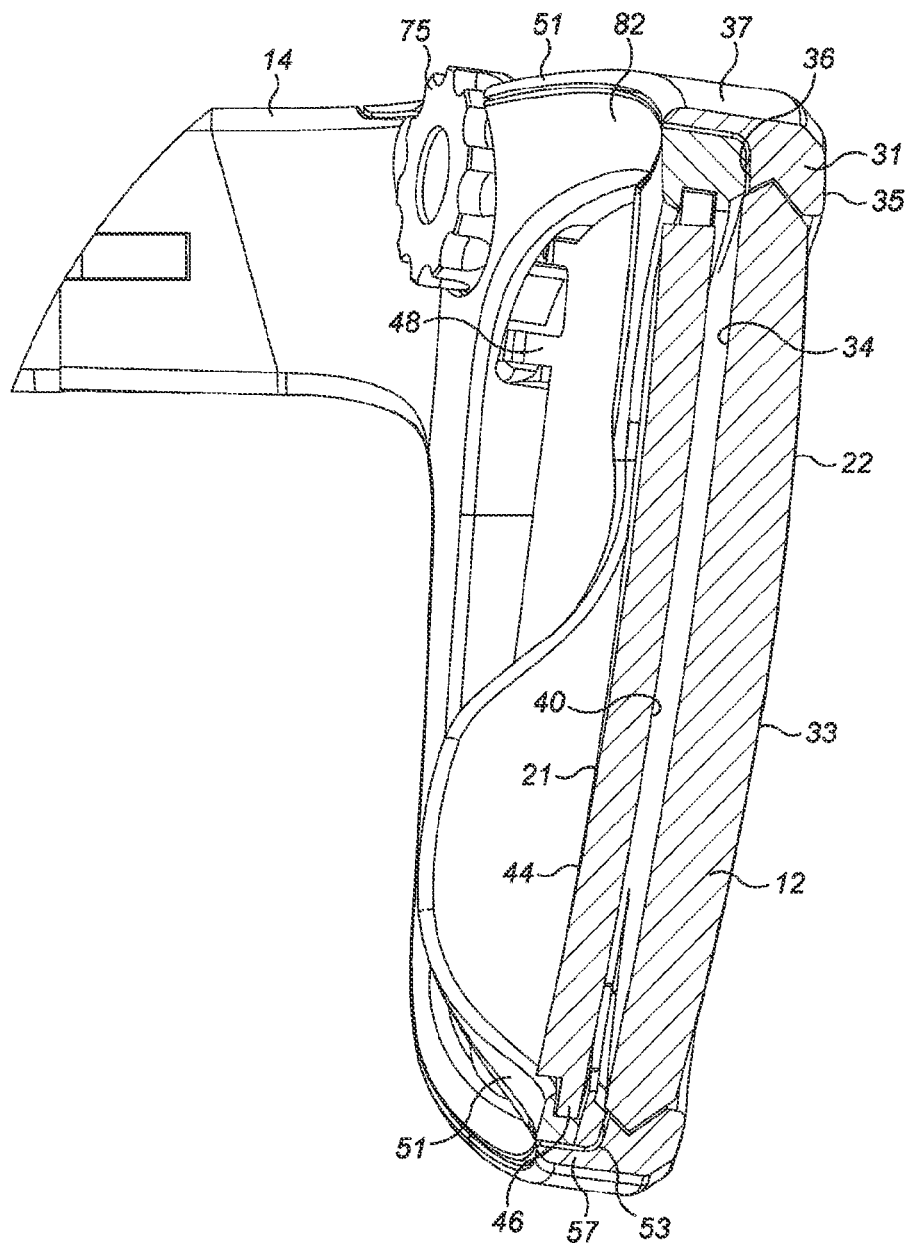
FIG. 4 is an enlarged view of a portion of FIG. 3, showing a left-hand one of the variable power lenses, which comprises a stationary front lens element, which is mounted in a detachable frame part, and a slidable rear lens element that are disposed one in front of the other along the z-axis of the lens.
Figure 5:
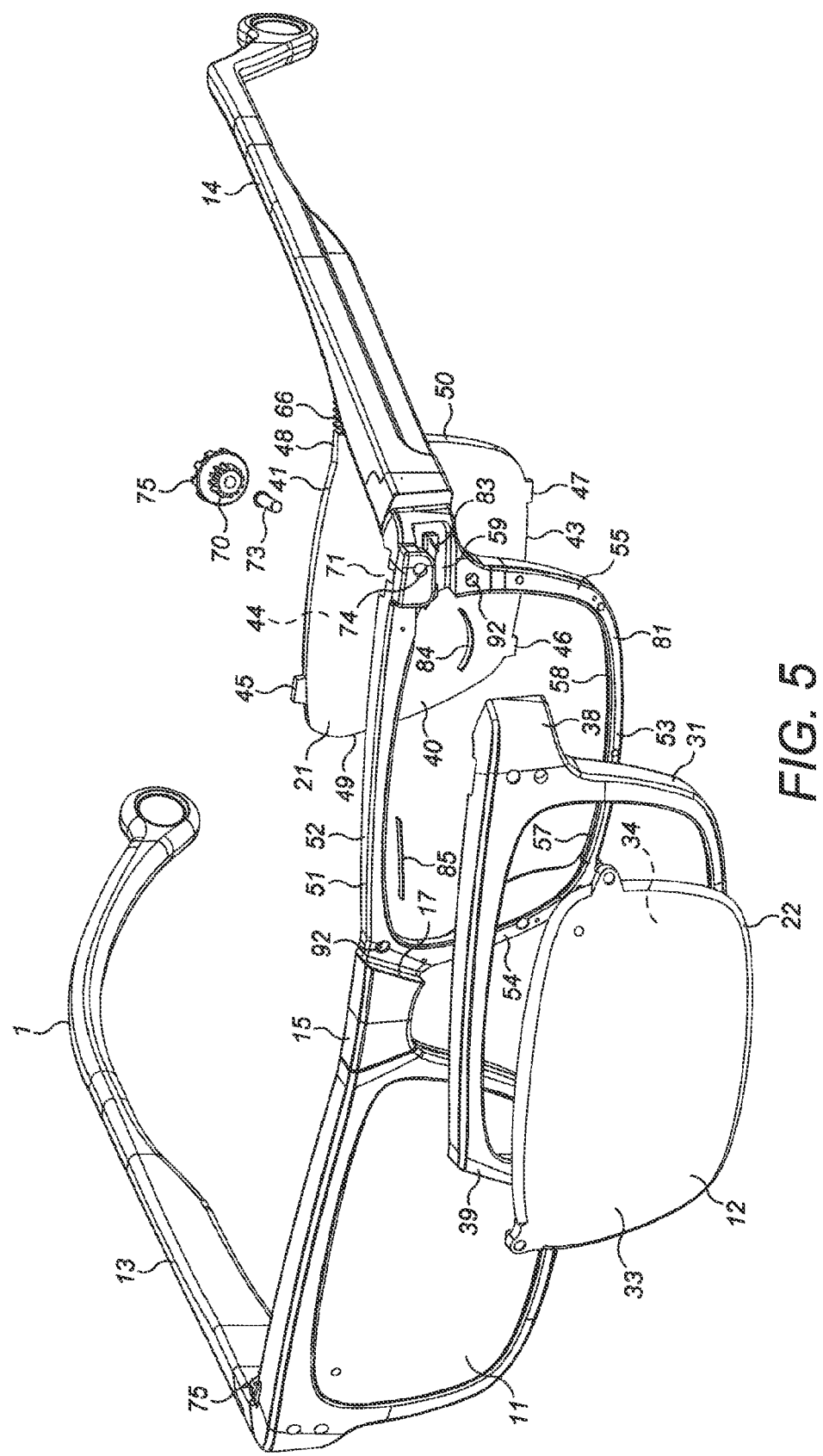
FIG. 5 is a front view from above and to one side of the glasses of FIG. 1 with the left-hand variable power lens exploded to show its component parts.

As best illustrated in FIG. 5, each variable power lens 11, 12 comprises two lens elements—a rear lens element 21 and a front lens element 22. The rear and front lens elements 21, 22 are arranged in tandem, with one being disposed behind the other as shown in FIGS. 4 and 5. The front lens element 22 is optically clear, having front and rear faces 33, 34 respectively, and is fixedly secured within a detachable frame part comprising a peripheral surround 31 as described in more detail below. The rear lens element 21 is also optically clear, having front and rear faces 40, 44 respectively and a plurality of protruding tabs 45-48. The front and rear lens elements 22, 21 may be free-formed from a suitable synthetic thermoplastic resin material of suitably optical and physical quality for ophthalmic use.

The rear lens element 21 is mounted slidably within a respective frame body 51 which is formed integrally with the nose-bridge 15. In the glasses 1 of the present embodiment therefore the frame body 51 of the two lenses 11, 12 are formed as a single piece including the nose-bridge 15, but in different embodiments, the frame body 51 of each lens 11, 12 may be formed separately and then joined to the nose-bridge 15. Further, in other embodiments (not shown) the front and rear lens elements 22, 21 may both be mounted within a frame body, dispensing with the need for a detachable frame part such as surround 31.

Figure 6:
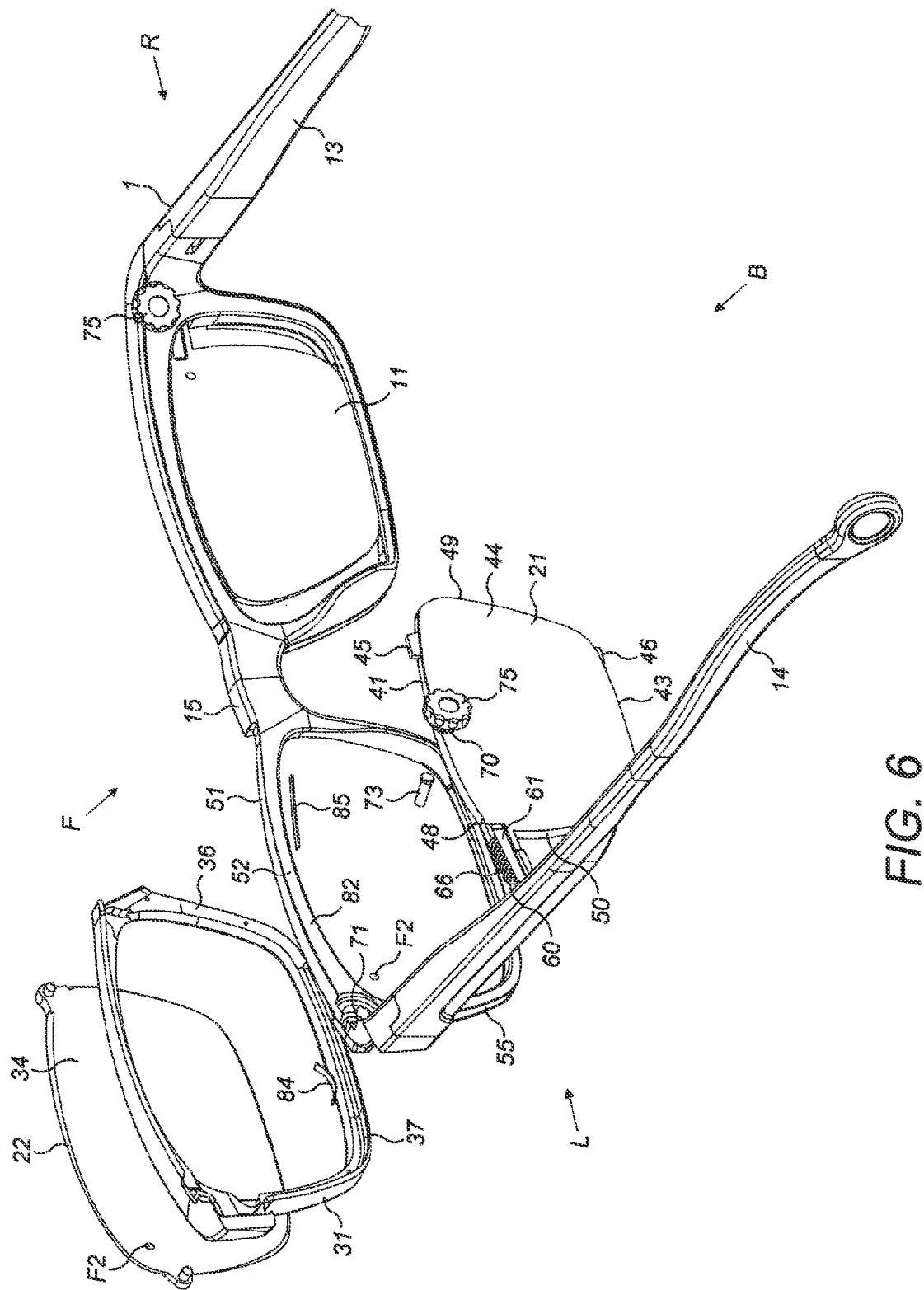
FIG. 6 is a rear view from above and to one side of the glasses of FIG. 1, corresponding to FIG. 5 and likewise showing the left-hand variable power lens exploded.
Figure 7:
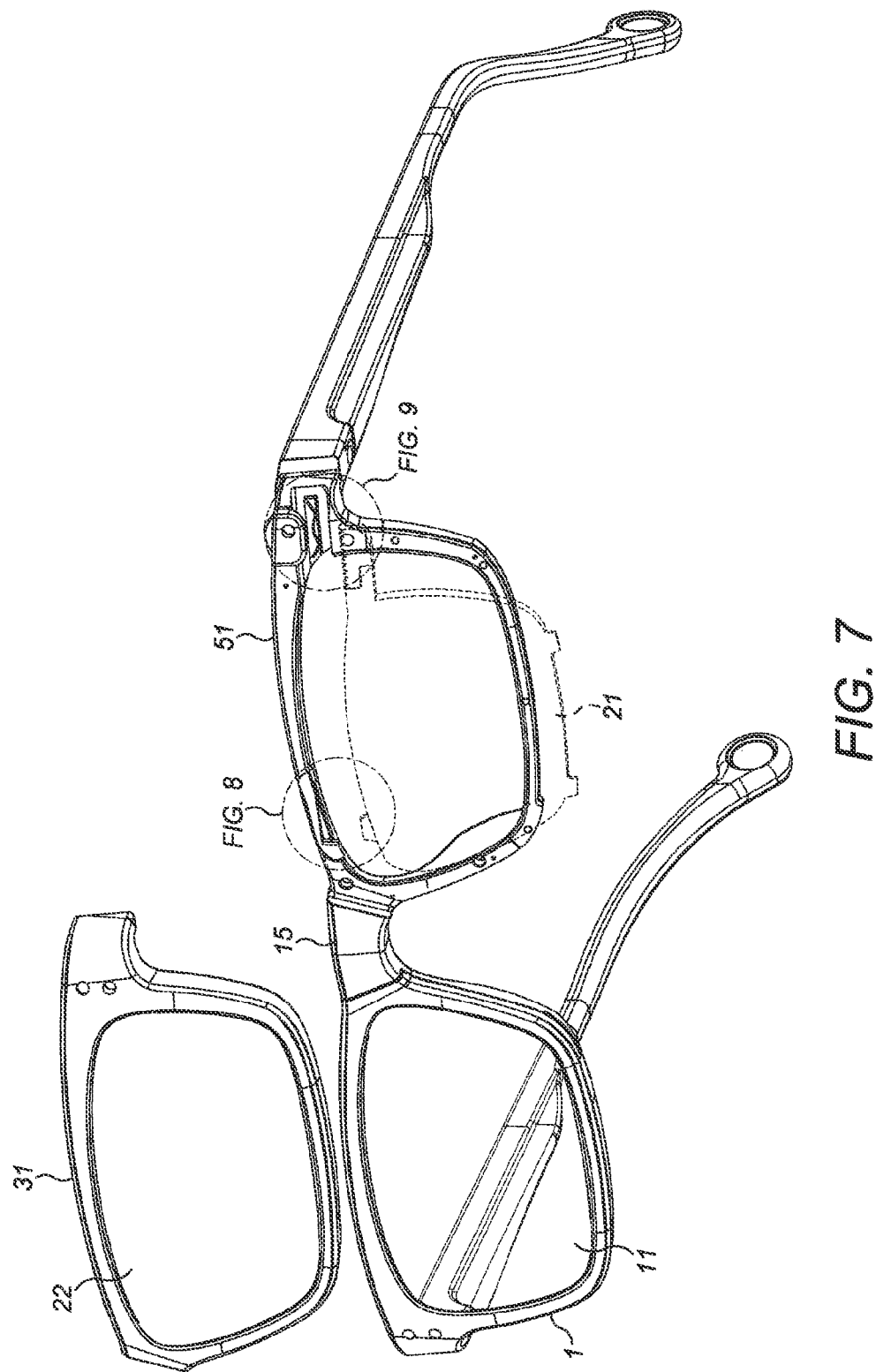
FIG. 7 is a front view from below and to one side of the glasses of FIG. 1 showing the detachable frame part that carries the front lens element of the left-hand variable power lens detached and the rear lens element exploded from a frame body to show protruding tabs on the rear lens element for guiding movement of the rear lens element along the x-axis relative to the frame body.

As illustrated best in FIGS. 5 and 6, the rear lens element 21 is generally rectangular having upper and lower long side edges 41, 43 and inner and outer short side edges 49, 50. As will be seen from the figures, the sides of the rear lens element 21 are not linear, but are curved in a manner that is conventional for ophthalmic lenses. The corners between the long and short side edges are also rounded. The side edges of the rear lens element 21 define its periphery.

Protruding from the periphery of the rear lens element 21 are an upper inner tab 45 which protrudes upwardly from the upper long side edge 41 proximate the nose-bridge 15, inner and outer lower tabs 46, 47 which depend from the lower long side edge 43 and an upper outer tab 48 which protrudes outwardly from the outer side edge 50 of the rear lens element 21 adjacent the upper side edge 41. As best shown in FIGS. 6, 14 and 15, the upper outer tab 48 is fabricated with a rack extension part 60 having a rear surface 61, which is formed with a recess 62 therein that defines an upwardly facing bearing surface 64 as described in more detail below, and an upper surface 65, which is formed with a plurality of teeth 66 that form a rack for engagement with a pinion 70, also described in more detail below.

Figure 8:
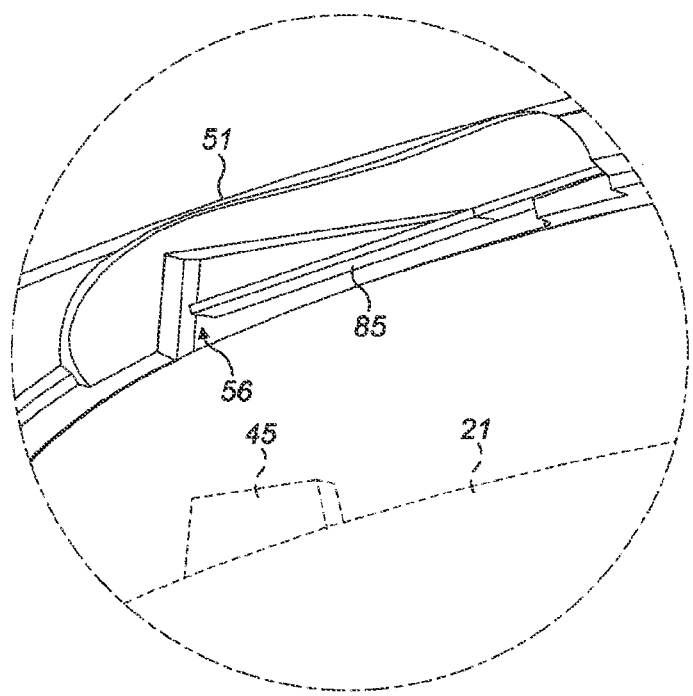
FIG. 8 is an enlarged view of a portion of FIG. 7, showing an upper inner tab on the rear lens element and a corresponding channel in the frame body with a leaf spring disposed therein for spring-loading the rear lens element against the frame body.
Figure 9:
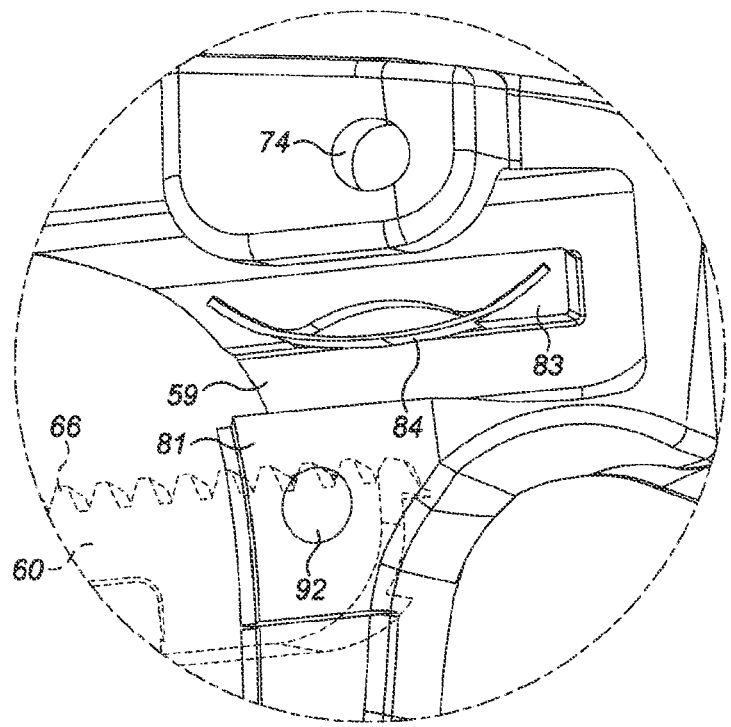
FIG. 9 is another enlarged view of a different portion of FIG. 7, showing an upper outer tab on the rear lens element and a corresponding channel in the frame body, also with a spring fitted therein for spring-loading the rear lens element in the frame body.

The frame body 51 has a front face 81 and a rear face 82 and defines a shape corresponding to the shape of the rear lens element 21 and comprises upper and lower portions 52, 53 and inner and outer side portions 54, 55. The height of the frame body 51 between the upper and lower portions 52, 53 is approximately the same as the height of the rear lens element 21 between its upper and lower side edges 41, 43; the width of the frame body 51 between the inner and outer side portions 54, 55 is wider than the width of the rear lens element 21 between its inner and outer side edges 49, 50 to allow the rear lens element 21 to slide from side to side relative to the frame body 51. The upper portion 52 of the frame body 51 is formed with an upwardly extending upper inner channel 56 as best seen in FIGS. 8 and 11 for receiving the upper inner tab 45 on the rear lens element 21. The upper inner channel 56 is dimensioned to allow the rear lens element 21 to slide relative to the frame body 51. The upper inner channel 56 accommodates a leaf spring 85 as best seen in FIG. 8 which engages with the upper inner tab 45 on the rear lens element 21 and pushes down on the same.

The lower portion 53 of the frame body 51 is formed with inner and outer lower channels 57, 58 as best seen in FIG. 5 for receiving the inner and outer lower tabs 46, 47 respectively. The inner and outer lower channels 57, 58 are dimensioned to allow the tabs 46, 47 to slide therein. The lower portion 53 of the frame body 51, the lower side edge 43 of the rear lens element 21 and the inner and outer lower tabs 46, 47 are shaped, so that when the rear lens element 21 is fitted in the frame body, the lower side edge 43 of the rear lens element 21 is seated on the lower portion 53 of the frame body 51, and the channels 57, 58 are configured to guide sliding movement of the rear lens element 21 relative to the frame body 51.

The upper outer tab 48 of the rear lens element 21 is received in a channel 59 formed in the front face 81 of the frame body 51 in the corner between the upper and outer portions 53, 55 (see FIG. 5). Within the channel 59, the front face 81 of the frame body 51 is formed with a forwardly protruding rib 83 which is formed with two slots for carrying a depending leaf spring 84. With the upper outer tab 48 of the rear lens element 21 received in the upper outer channel 59, the rib 83 is received in the recess 62 formed in the rack extension part 60 for guiding sliding movement of the rear lens element 21 relative to the frame body 51 and the leaf spring 84 engages with and pushes downwardly on the upwardly facing hearing surface 64 of the rack extension part 60.

The effect of the leaf springs 84, 85 pushing downwardly on the rear lens element 21 is to urge the rear lens element downwardly against the lower portion 53 of the frame body 51, so that its lower side edge 43 is firmly seated against the lower portion 53 of the frame body 51, and this serves to register the rear lens element 21 of the lens 12 to a datum to ensure accurate positioning of lens element 21 relative to the frame body 51. In the present embodiment, the slidable rear lens element 21 is registered against a datum in the direction of the y-axis. It will be understood that the principles of the invention may also be adapted to spring-load the rear lens element 21 against the frame body 51 in the direction of the z-axis as well as, or instead of, the y-axis.

The rear lens element 21 is thus able to slide from side to side within the frame body 51 in a direction transverse the optical axis and its movement is guided by the engagement of the tabs 45-48 in the corresponding channels 56-59. The axis of movement of the rear lens element 21 is designated the x-axis. As mentioned above, the z-axis is designated parallel to the optical axis of the lens 12. The y-axis is perpendicular to both the x- and z-axes and corresponds generally to the vertical axis relative to the normal orientation of the glasses 1 when they are worn. The leaf springs 84, 85 act to push against the rear lens element 21 in the direction of the y-axis. In practice the rear lens element 42 is curved as described in detail below, and accordingly the locus of sliding movement defined by the tabs 45-48 and corresponding channels 56-59 is also curved.

Figure 2:
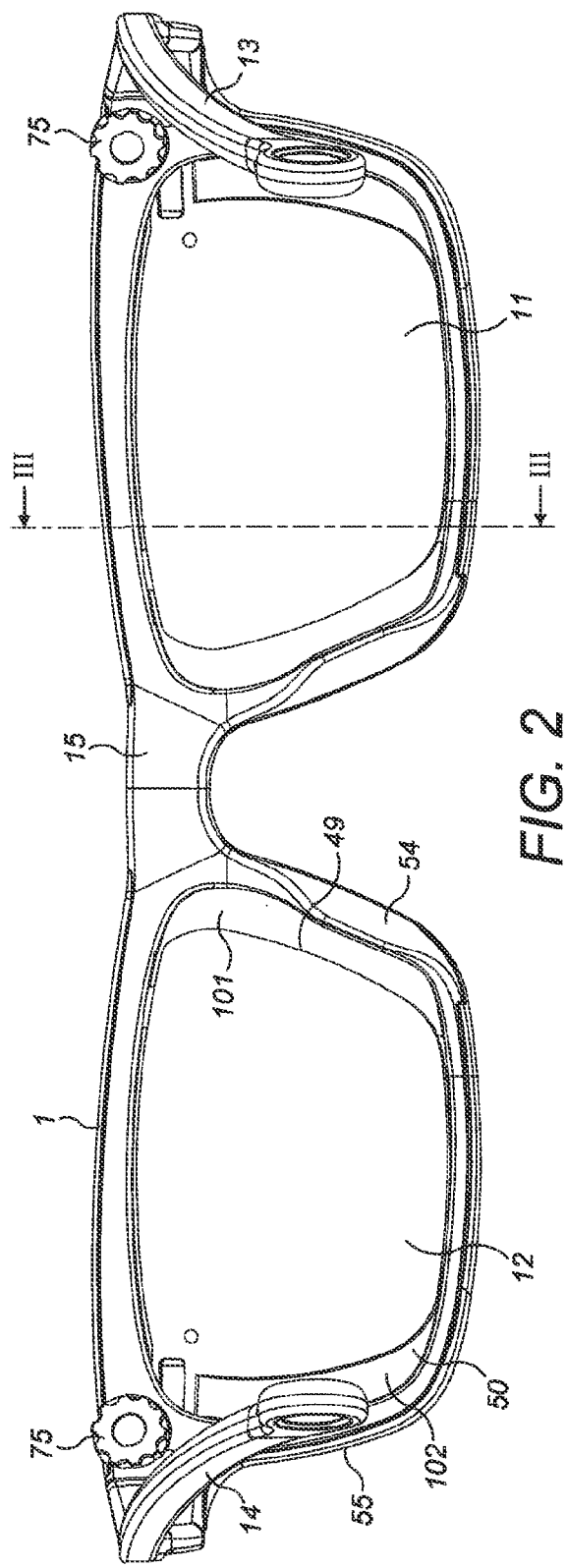
FIG. 2 is a rear view of the glasses of FIG. 1.
Figure 3:
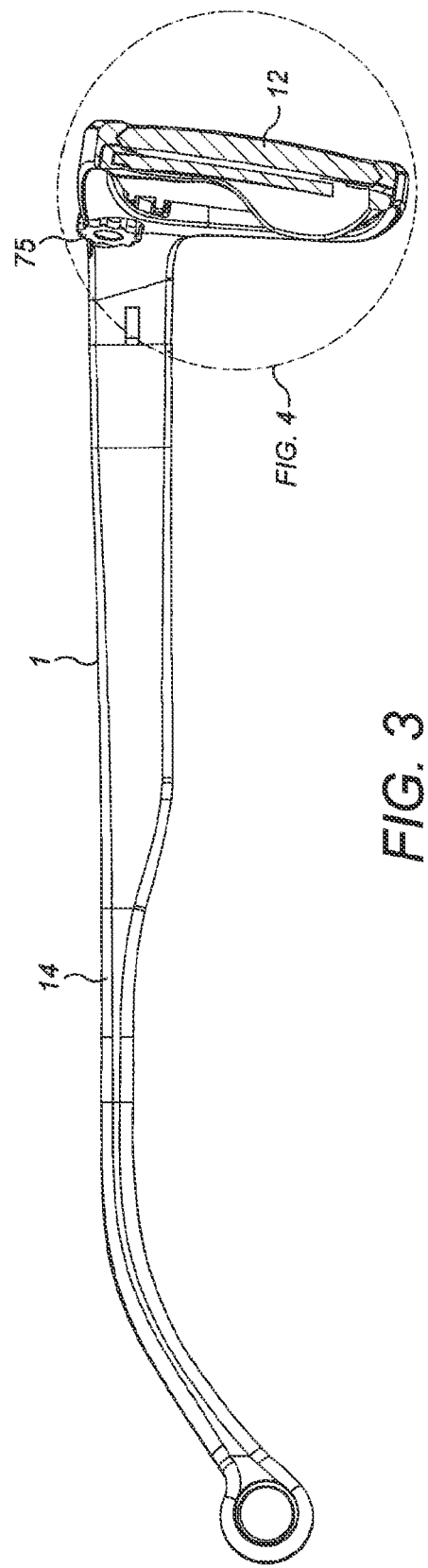
FIG. 3 is a side view of the glasses, partly in cross-section on the line III-III of FIG. 2.

The teeth 66 of the rack extension portion 60 engage with the pinion 70 which is mounted within a suitably shaped recess 71 formed in the rear face 82 of the frame body 51, as best seen in FIG. 6. The pinion 70 is fitted with a stub-axle 73 that is journalled in a hole 74 formed in the frame body 51 within the recess 71 to permit rotation of the pinion 70. The pinion 70 is also fitted with a thumbwheel 75 having a slightly greater outer diameter than the pinion 70. As can be seen in FIG. 2, the thumbwheel 75 protrudes above the upper portion 52 of the frame body 51 so that it can be engaged with a wearer's fingertip for manually rotating it. Rotation of the thumbwheel 75 causes corresponding rotation of the pinion 70 which, since it is engaged with the teeth 66 of the rack extension portion 60 thus causes sideways movement of the rear lens element 21 relative to the frame body 51. The thumbwheel 75 can thus be used by the wearer for adjusting the power of the lens 12 as described in more detail below. As will be seen from the figures, each lens 11, 12 has its own adjustment mechanism comprising a thumbwheel 75 for independent adjustment of the two lenses 11, 12, but as mentioned above, in some embodiments, a single adjustment mechanism (not shown) may be provided to adjust both lenses 11, 12 simultaneously.

As mentioned above, in the present embodiment, the front lens element 22 is mounted fixedly within a detachable frame part comprising a lens surround 31. The lens surround 31 has a front face 35 and a rear face 36. The rear face 36 of the lens surround 31 comprises a skirt portion 37 that extends around the upper, lower and outer portions of the lens surround 31. The lens surround 31 is shaped and configured to mate with the lens body 51 for removably attaching the lens surround 31 to the lens body 51. When attached, the skirt portion 37 extends over the upper, lower and outer side portions 52, 53, 55 of the lens body 51. The lens surround 31 comprises an upper outer shoulder portion 38, which extends over and closes the upper outer channel 59 formed in the frame chassis 51 and the front of the hole 74 that accommodates the pinion axle 73, and an upper inner shoulder portion 39 that is configured to abut a corresponding shaped step 17 formed between the nose-bridge 15 and the frame body 51. The interengagement of the skirt portion 37 and inner and outer upper shoulder portions 38, 39 with corresponding formations on the frame chassis 51 serve to position the lens surround 31 relative to the frame body 51. The frame surround 31 is dimensioned to form a close fit on the frame body 51 such that it is held in place by friction. If desired, interengaging snap fittings or detents may be provided on the lens surround 31 and frame body 51 for extra security.

In order to locate the front lens element 22 accurately relative to the rear lens element 21, the rear face 36 of the lens surround 31 and the front face 81 of the frame body 51 are formed with interengaging formations. In particular, the rear face 36 of the lens surround 31 and front face 81 of the frame body 51 are formed with interengaging alignment pins 90 and corresponding recesses 92 in which the alignment pins 90 are received. All of the alignment pins 90 may be formed on either the lens surround 31 or frame body 51, or one or more alignment pins 90 may be provided on the lens surround 31 and one or more on the frame chassis 51. In the present embodiment, two alignment pins 90 are provided on the front face 81 of the frame body 51 and one alignment pin 90 (not shown) is provided on the rear face 36 of the lens surround 31 for engaging in the recess 92 shown in FIG. 5 in the inner portion 54 of the frame body 51. Regardless of whether the alignment pins 90 are provided on the lens surround 31 or frame body 51, at least two, and preferably three or more, alignment pins 90 should be provided.

The alignment pins 90 and recesses 92 thus serve accurately to locate the front lens element 22 relative to the frame body 51 and therefore the rear lens element 21. When attached to the frame body 51, the front lens element 22 is mounted immovably relative to the rear lens element 21. The removability of the surround 31 allows the front face 40 of the rear lens element 21 and the rear face 34 of the front lens element 22 to be accessed for cleaning. In some embodiments, at least the front face 40 of the rear lens element 21 and the rear face 34 of the front lens element 22 may be coated with a hydrophobic, super-hydrophobic or oleophobic coating of the kind known in the ophthalmic industry for protecting the lens surfaces against dust and dirt. For example PTFE may be used for this purpose.

In some embodiments, the detachable lens surround 31 may be omitted and the front lens element 22 may be fitted immovably to the frame body 51 in front of the movable rear lens element 21.

The front and rear lens elements 22, 21 form a variable optical power lens 12. In order to achieve this, the thicknesses of the front and rear lens elements 22, 21 are controlled to provide cooperating lens surfaces that give a different lens power depending on the relative dispositions of the two lens elements 22, 21. In general, one face 33, 34; 40, 44 of each of the lens elements 22, 21 is formed with a cubic or higher order surface, while the other face 34, 33; 44, 40 of each lens element 22, 21 is formed with a surface that is a regular surface of revolution, for example spherocylindrical, or another conventional ophthalmic lens surface, for example a multifocal or progressive lens surface. It may be desirable for the two lens elements 22, 21 to define a base curve, with the front face 33 of the front lens element 22 convex, and the rear face 44 of the rear lens element 21 concave, so that as the lens 12 is adjusted by sliding the rear lens element 21 relative to the frame body 51, or when the wearer moves his or her eye from side to side, the distance between the eye and the lens 12 remains substantially constant. Specifically, the locus of sliding movement defined by the tabs 45-48 and corresponding channels 56-59 may be concentric with the quadratic base curve component of the lens thickness t as defined by the formula below.

In the present embodiment, the front face 40 of the rear lens element 21 and the rear face 34 of the front lens element 22, as defined by the thickness t of the lens element 21, 22 parallel to the z-axis, are given cubic surfaces according to the formula:

$$t = A\left(\frac{x^3}{3} + xy^2\right) + Dx + E \qquad (I)$$

wherein D is a constant representing the coefficient of a prism removed to minimise lens thickness and may be zero, E is a constant representing lens element thickness at the optical axis, x, y and z are the axes described above and A is a constant representing the rate of lens power variation with relative lens element movement in the x direction, being positive for one of the lens elements 22, 21 and negative for the other lens element 22, 21. Other suitable cubic and higher-order surfaces are described in U.S. Pat. No. 3,305,294 (Alvarez), U.S. Pat. No. 3,583,790 (Baker), U.S. Pat. No. 7,338,159 (Spivey), U.S. Pat. No. 7,717,552 (Spivey), U.S. Pat. No. 5,644,374 (Mukaiyama) and WO 2013/030603 (Gici Labs), the contents of all of which are incorporated herein by reference.

The present invention is not limited by the precise form of the lens surfaces used, only that the lens elements 22, 21 should cooperate to form a variable power lens, the power of which can be adjusted by relative movement of the two lens elements 22, 21 in a direction transverse the optical axis of the lens 11, 12 under the control of the adjustment mechanism 60, 70.

In accordance with one aspect of the present invention however it is important that the rear and front lens elements 21, 22 are configured and arranged such that as the rear lens element 21 is moved inwardly on the x-axis relative to the frame body 51, the optical power of the lens 12 progressively increases. In other words, when the thumbwheel 75 associated with the left-hand lens 12 of the glasses 1 is rotated clockwise as viewed from behind (see FIG. 2) the rear lens element 21 is moved inwardly towards the nose-bridge 15 to increase the power of the lens 12. When the rear lens element 21 is moved outwardly on the x-axis relative to the frame body 51, the optical power of the lens 12 is decreased. (For the right-hand lens 11, the associated thumbwheel 75 should be rotated anticlockwise to move the rear lens element of that lens inwardly to increase its power).

As mentioned above, in order to permit lateral sliding of the rear lens element 21 of the lens 12 in the present embodiment of the invention, the width of the rear lens element 21 between its inner and outer side edges 49, 50 is less than the width between the inner and outer portions 54, 55 of the frame body 51. This is best seen in FIG. 2 in which an inner gap 101 can be seen between the inner side edge 49 of the rear lens element 21 and the inner portion 54 of the frame body 51, and an outer gap 102 is visible between the outer side edge 50 of the rear lens element 42 and the outer portion 55 of the frame body 51. The sizes of the inner and outer gaps 101, 102 change as the rear lens element 21 is moved from side to side under the control of the thumbwheel 75 and rack and pinion mechanism 60, 70. In accordance with the present embodiment, the size of the inner gap 101 should be minimised when the lens 12 is in its maximal power position, with the rear lens element 21 moved fully inwardly towards the nose-bridge 15. This is because as the wearer increases the power of the lens for viewing near objects, for example computer screens or for reading, his or her eyes will naturally converge thereby reducing the inter-pupillary distance.

The inner and outer side edges 49, 50 of the rear lens element 21 will be visible to the wearer in at least some positions of the rear lens element 21, and it is desirable that these edges should not distract the wearer as far as that can be avoided. In the present embodiment, the periphery of the front lens element 22 is concealed by the lens surround 31. In accordance with the present invention, the difference in the widths of the rear lens element 21 between its inner and outer side edges 49, 50 and the front lens element 22 between the inner and outer side portions 54, 55 of the frame body 51, i.e. along the x-axis, should be no more than about 8 mm, preferably less than 6 mm, and more preferably less than 4 mm. In the maximum power position of the present embodiment, the inner side edge 49 of the rear lens element 21 is aligned with the inner portion 54 of the frame body 51 so that the width of the inner gap 101 is zero or as close to zero possible while the width of the outer gap 102 in this position is no more than about 8 mm and preferably less, as described above. In the minimal power position, the outer side edge 50 of the rear lens element 21 is aligned with the outer side portion 55 of the frame body 51 so that the width of the outer gap 102 is zero or as close to zero possible while the width of the outer gap 102 in this position is no more than about 8 mm and preferably less, as described above.

It will be understood that in other embodiments, in the maximal power position, the outer side edge 50 of the rear lens element 21 may be aligned with the outer side portion 55 of the frame body. In still other embodiments, in the minimal power position, the inner side edge 49 of the rear lens element 21 may be aligned with the inner side portion 54 of the frame body 51. In these other embodiments, the frame body 51 may be configured to conceal the inner side edge 49 of the rear lens element 21 in the maximal power position and/or the outer side edge 50 of the rear lens element 21 in the minimal power position, for instance by having a recess formed in the frame body 51 in which the side edge(s) 49, 50 concerned are received and hidden from view.

The present invention also provides an improved method for manufacturing the front and rear lens elements 22, 21 of the lens 12.

According to the invention, each of the front and rear lens elements 22, 21 is first injection moulded in the form of a circular puck 200 of non-uniform thickness, as shown in FIGS. 17 and 18. The puck is formed with two opposite faces 201, 202 and has a circular periphery 205. One of the faces 201 is formed, in a central region 204, with a cubic or higher-order surface of the kind described in detail above that is centred on the centre of the puck 200. For example, the one face 201 may be formed with a surface described by formula (I) above. The other face 202 is formed with a surface which is a regular surface of revolution such, for example, as an ophthalmic sphero-cylindrical surface comprising a sphere and/or cylinder component. The regular surface of revolution formed on the other face 202 may be confined to the central region of the puck 200 in alignment with the central region 204 on the one face 201 on which the cubic or higher-order surface is formed. In some embodiments, the other face 202 may be formed with a multifocal or progressive lens surface. It will be appreciated that the shape of the lens surface formed on the one face 201 of the puck 200 is defined by the thickness of the puck 200 between the two faces 201, 202 according to the selected cubic or higher order function.

Away from the central region 204 of the puck 200, towards its periphery 205, the thickness of the puck would become very large in some regions and very thin in other regions and potentially difficult or even impossible to make as result of the behaviour of the cubic or higher-order function. Accordingly, in circumferentially spaced peripheral regions 206 towards its periphery 205, the puck 200 is formed with an adjusted thickness that is greater or less than would otherwise be implied by the cubic or higher-order function, and the cubic or higher-order surface is "blended in" to those peripheral regions 206 of modulated thickness.

After being released from the mould, the circular puck 200 is marked with one or more fiducial markings F1, F2 as alignment features on one or both surfaces 201, 202 to locate accurately the position of the cubic or higher-order surface relative to the physical geometry of the puck 200 and optionally for alignment of the front and rear lens elements as described in more detail below.

Thereafter, the puck 200 can be edged to form a non-circular lens element 22, 21 of a desired shape with a required centration. As long as the position of the cubic or higher-order surface relative to the puck 200 is identified by the fiducial marking(s) F1, F2, the circular puck 200 can be held by a suitable tool and edged by trimming its periphery to the desired shape with the required centration, FIG. 17 shows the positions of lenses c1, c2, c3 of the same eyeshape but different centres, while FIG. 18 shows the positions of lenses of different eyeshapes s1, s2, s3, which can all be cut out from the same puck 200. The blended in peripheral regions 206 do not fall within the final lens elements 32, 42. It will be observed that while the fiducial markings F1 fall outside the eyeshapes and so are removed on edging the puck 200, while the fiducial markings F2 fall inside the eyeshapes and are not removed. The fiducial markings F2 may be visible or semi-visible markings of the kind known in the art.

One or both surfaces 201, 202 of the puck 200 can then be treated, if desired, with one or more optical coatings of the kind known in the art, including, for example, a hydrophobic, super-hydrophobic or oleophobic coating as described above.

The lens elements 22, 21 should be manufactured in matching pairs of the same eye shape and centration for assembly to form a variable optical power lens 11, 12 of the kind described above by assembling the lens elements 22, 21 one behind the other such that they are slidable relative to one another in a direction transverse the optical z-axis and providing a suitable adjustment mechanism (60, 70) for controlling the relative disposition of the two lens elements. The fiducial markings F2 that remain within the eyeshape after edging the puck 200 may be used for correctly aligning the front and rear lens elements 22, 21 with each other in the frame.

One or both lens elements 22, 21—for instance a rear lens element 21 of the kind described above—may be cut out from the puck 200 with outwardly protruding peripheral tabs 45-48. Alternatively, peripheral tabs 45-48 may be attached to the lens element 21 after it has been cut out from the puck 200, for example by bonding or welding. Depending on the precise form of the cubic or higher-order function used to define the lens surface, the lens produced in accordance with the method of the present invention may provide a variation in optical power of at least +0.75 dioptres and, in some embodiments, up to +2.0 dioptres or +3.5 dioptres.

The advantage of the method of making a lens 11, 12 with lens element 22, 21 according to the present invention is that it allows lens elements of multiple different eye shapes and centrations to be formed from the same shaped puck 200. This greatly simplifies the manufacture of the lens elements and allows a stock of pucks 200 to be made and then finished by edging to order.

The invention claimed is:

1. A pair of glasses comprising two lenses and one or more frame parts;
wherein one or both of the lenses are adjustable, comprising two superposed lens elements and a selectively operable optical power adjuster, the lens elements being slidable relative to each other in a direction transverse the optical axis of the lens under the control of the optical power adjuster and having respective lens surfaces that are shaped to act together to form a corrective lens, the focal power of which varies according to the relative disposition of the two lens elements; wherein upon increasing the focal power of the adjustable lens, the centration distance between the two lenses progressively decreases to match substantially the interpupillary distance of the user's eyes.

2. The pair of glasses as claimed in claim 1, wherein the one or more frame parts include a nose-bridge and each of the lens elements has an inner side edge proximate the nose-bridge and an outer side edge disposed away from the nose-bridge, the lens elements being movable relative to one another towards or away from the nose-bridge; wherein in a maximal power position the outer side edges of the lens elements are substantially aligned with one another.

3. The pair of glasses as claimed in claim 1, wherein the one or more frame parts include a nose-bridge and each of the lens elements has an inner side edge proximate the nose-bridge and an outer side edge disposed away from the nose-bridge, the lens elements being movable relative to one another towards or away from the nose-bridge; wherein in the maximal power position the inner side edges of the lens elements are substantially aligned with one another.

4. The pair of glasses as claimed in claim 1, wherein the one or more frame parts include a nose-bridge and each of the lens elements has an inner side edge proximate the nose-bridge and an outer side edge disposed away from the nose-bridge, the lens elements being movable relative to one another towards or away from the nose-bridge; wherein in a minimal power position the inner side edges of the lens elements are substantially aligned with one another.

5. The pair of glasses as claimed in claim 1, wherein the one or more frame parts include a nose-bridge and each of the lens elements has an inner side edge proximate the nose-bridge and an outer side edge disposed away from the nose-bridge, the lens elements being movable relative to one another towards or away from the nose-bridge; wherein in the minimal power position the outer side edges of the lens elements are substantially aligned with one another.

6. The pair of glasses as claimed in claim 1, wherein the lens elements have different widths between their respective inner and outer side portions.

7. The pair of glasses as claimed in claim 6, wherein the difference in width between respective inner and outer side edges of the lens elements is no more than about 8 mm, preferably less than about 6 mm, and more preferably no more than about 4 mm.

8. The pair of glasses as claimed in claim 1, wherein the lens elements are mounted to the one or more frame parts such that one of the lens elements is movable and the other lens element is immovable relative to the one or more frame parts.

9. The pair of glasses as claimed in claim 8, wherein the movable lens element comprises a transparent lens element that is mounted to a frame body slidably in a direction transverse the optical axis of the lens.

10. The pair of glasses as claimed in claim 8, wherein the immovable lens element comprises a transparent lens element that is mounted to a detachable surround that can be removably fastened to the frame body.

11. The pair of glasses as claimed in claim 10, wherein the frame body and the surround are provided with mutually cooperating formations for accurately positioning the immovable lens element relative to the movable lens element.

12. The pair of glasses as claimed in claim 8, wherein the immovable lens element is mounted in front of the movable lens element relative to a wearer when the glasses are worn.

13. The pair of glasses as claimed in claim 1, wherein both lenses are adjustable.

14. The pair of glasses as claimed in claim 13, wherein the lenses are separately adjustable.

* * * * *